United States Patent
Stahl

[19]

[11] Patent Number: 5,942,925
[45] Date of Patent: Aug. 24, 1999

[54] POWER-ON DETECTION AND ENABLING CIRCUIT WITH VERY FAST DETECTION OF POWER-OFF

[75] Inventor: Ernst J. Stahl, Essex Junction, Vt.

[73] Assignee: Siemens Aktiengesellschaft, Munich, Germany

[21] Appl. No.: 08/940,899

[22] Filed: Sep. 30, 1997

[51] Int. Cl.$^6$ ...................................................... H03L 7/00
[52] U.S. Cl. .......................................... 327/143; 327/198
[58] Field of Search ................................... 327/142, 143, 327/198

[56] References Cited

U.S. PATENT DOCUMENTS

| | | | |
|---|---|---|---|
| 4,591,745 | 5/1986 | Shen | 307/592 |
| 4,607,178 | 8/1986 | Sugie et al. | 307/594 |
| 4,886,984 | 12/1989 | Nakaoka | 307/272.3 |
| 4,983,857 | 1/1991 | Steele | 307/272.3 |
| 5,467,039 | 11/1995 | Bae | 327/198 |
| 5,721,502 | 2/1998 | Thomson et al. | 327/143 |
| 5,767,710 | 6/1998 | Cho | 327/143 |

Primary Examiner—Timothy P. Callahan
Assistant Examiner—Jeffrey Zweizig
Attorney, Agent, or Firm—Stanton C. Braden

[57] ABSTRACT

Power-on detection circuitry with almost instantaneous response to a power-off condition includes a network of several transistors (30, 32, 38, 40) and a resistor (34). When a supply voltage (+VCC) used with the circuitry is first turned on, the network produces at an output (terminal 52) a short pulse which is subsequently used to generate a power-on (PWRON) signal (line 24) to reset or initialize circuit elements termed "latches" (14). The latches (14) in turn provide operating information to other (main) circuits (16). A reverse coupled diode-connected transistor (30) is provided to shunt to ground charge stored in parasitic capacitance (36) at an input (terminal 50) when power is interrupted, such as by a sudden negative voltage transient. This shunting action of the diode-connected transistor (30) virtually instantly brings the voltage at the input down almost to zero so that whenever power comes back on another short pulse at the output is sure to be generated. This short pulse at the output in turn generates a new PWRON signal for re-setting the latches (14) even though power has been interrupted for only a few nanoseconds.

10 Claims, 3 Drawing Sheets

POWER-ON DETECTION AND ENABLING CIRCUIT WITH VERY FAST DETECTION OF POWER-OFF

FIELD OF THE INVENTION

This invention relates to an improved electronic circuit for detecting when power (voltage) is turned on (or off) and for providing an initial enabling signal to other circuits, such as latches, for resetting them to predetermined conditions after voltage is restored to a stable operating value.

BACKGROUND OF THE INVENTION

An integrated circuit (IC) may contain thousands of transistors, gates, latches, memory units etc., and a very large scale integrated (VLSI) circuit may contain a million or more active on a single silicon chip. The elements are organized into complex circuits of different kinds to serve a wide variety of applications. Some of these circuits, for proper operation when power to them is turned on, require that elements of the circuit be set to predetermined conditions or patterns of memory settings, by a process termed "initializing". Such a process is well known in the art and, for example, is accomplished by initially setting a number of "latches" (memory cells) to predetermined settings in a desired initial pattern. The initial setting of such latches must be carried out each time power to the circuits is again turned on after being off for even a brief instant.

To determine when power supply voltage to an IC comes on and has reached stable, sufficient operating level, circuits to detect when power is on have previously been developed. For example, when power is first turned on and as the supply voltage is beginning to rise from zero, a power-on detection circuit senses this condition and immediately generates a short pulse even before the supply voltage has reached full level. This short pulse in turn is used to generate a longer, somewhat delayed power-on signal (PWRON) which causes latches coupled thereto to be properly "initialized" to their predetermined settings. Thereafter, with a supply voltage at stable, full operating level the latches continuously send the information now stored in them to other circuits (i.e., the main circuits of the IC) as part of their operating program. When power is turned off, even for an instant, the latches can lose their settings, and must be reset (initialized) when power is restored. Failure to properly set (or reset) the latches results in erroneous or incorrect operation of the main circuits, as is well known.

When, for example, equipment (e.g., a large computer) is first turned on there may occur sudden negative voltage transients as various circuits within the equipment are powered up at slightly different times. Such negative voltage transients are random and can occur anytime after power is turned on. When such a negative voltage transient does occur, it can cause the latches to lose their proper settings. Unless the latches are immediately reset, the main circuits will not operate properly in the event power is immediately restored. Previous power-on detection circuits have been unable to respond quickly enough to such sudden negative voltage transients and so latches remained improperly set when power came on again.

It is desirable to have a power-on detection circuit which responds almost instantly to a power-off condition and is well adapted for fabrication on a VLSI circuit chip along with the main circuits on the chip.

SUMMARY OF THE INVENTION

The present invention is essentially directed to power-on detection circuitry which detects when the voltage of a power supplied used therewith is turned-on and reaches a preselected voltage level. In response to this condition the circuitry generates a voltage pulse. If the voltage level of the power supply voltage should drop for any reason (e.g., a sharp short time duration noise spike) below the preselected level, then the circuitry rapidly discharges the voltage of a control (common) terminal thereof and thus permits the circuitry to rapidly generate another voltage pulse in respond to the voltage of the power supply returning to the preselected level.

In one aspect the present invention is directed to power-on detection circuitry which comprises voltage pulse generating circuit and voltage lowering circuit means. The voltage pulse generating circuit means, which has a control terminal and a first power supply terminal, generates a voltage pulse at a first common terminal thereof when a supply voltage of at least a preselected voltage level is applied to the first power supply terminal. The voltage lowering circuit means, which is coupled to the control terminal, rapidly lowers the voltage of the control terminal if the supply voltage applied to the first power supply terminal first reaches or exceeds the preselected voltage level and then drops below the preselected voltage level such that when the first power supply terminal again reaches or exceeds the preselected voltage level, the voltage pulse generating circuit means can rapidly generate another voltage pulse at the first common terminal.

Viewed from an other aspect, the present invention is directed to power-on detection circuitry. The power-on detection circuitry comprises first and second p-channel field effect transistors and first and second n-channel field effect transistors, each of the transistors having a gate, and first and second output terminals, resistive means, which has first and second terminals, for providing a resistance between the first and second terminals, and parasitic capacitive means for storing charge. The gates of all of the transistors, the first output terminals of the second p-channel and n-channel transistors, the first terminal of the resistive means, and the capacitive means are all coupled to a first common terminal. The first output terminal of the first p-channel transistor, the second output terminal of the second p-channel transistor and the second output terminal of the second n-channel transistor are all coupled to a first power supply terminal. The second output terminal of the first p-channel transistor and the first output terminal of the first n-channel transistor are coupled to an output terminal of the power-on detection circuitry. The second terminal of the resistive means and the second output terminal of the first n-channel transistor are coupled to a second power supply terminal.

A better understanding of the invention together with a fuller appreciation of its important advantages will best be gained from a study of the following description given in connection with the accompanying drawings and claims.

DETAILED DESCRIPTION

Figure 1:
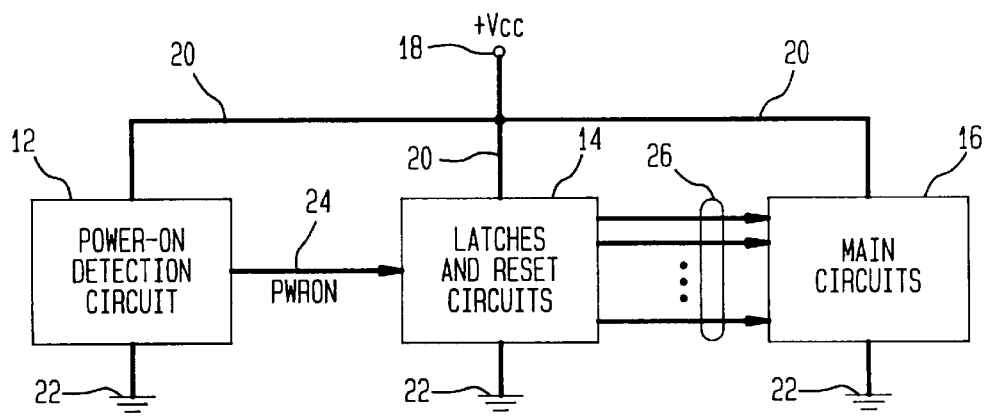
FIG. 1 shows a system comprising latches and reset circuit, main circuits, and power-on detection circuitry provided in accordance with the present invention.

Referring now to FIG. 1, there is shown a a system 10 comprising main circuits 16, latches and reset circuits 14 and power-on detection circuitry 12 which is in accordance with the present invention. System 10 is typically integrated on a single integrated circuit chip which is formed from part of a silicon wafer (not shown) using complimentary metal oxide semiconductor (CMOS) technology. System 10 may, for example, contain a million or more components. The design and fabrication of such chips are well known in the art and will not be described in detail herein. A power supply voltage (+VCC) is connected to a terminal 18 which in turn is connected to circuitry 12 and circuits 14 and 16. A reference power supply voltage (e.g., ground) is connected to a terminal 22 and to circuitry 12 and circuits 14 and 16. Terminals 18 and 22 may be denoted as first and second power supply terminals, respectively. The power-on detection circuitry 12 is typically only a very small portion of system 10 and typically consumes relatively low power (e.g., microwatts).

When power is turned on (or turned back on after an interruption) the power-on detection circuitry 12, after suitable time delay, applies a PWRON signal to the latches and reset circuits 14 via a lead 24. On receipt of a PWRON signal, the latches are set (or reset) to initial, predetermined conditions. The design and operation of the latches and how they are initially set to predetermined settings are well known in the art and are not further described. Information from the latches 14 is applied to the main circuits 16 via a plurality of leads 26. This initializing or pre-setting of the latches 14 after power-off and then on is important for proper operation of the main circuits 16, as is well known. The design and operation of the main circuits 16 are well known in the art and are not further described herein.

Figure 2:
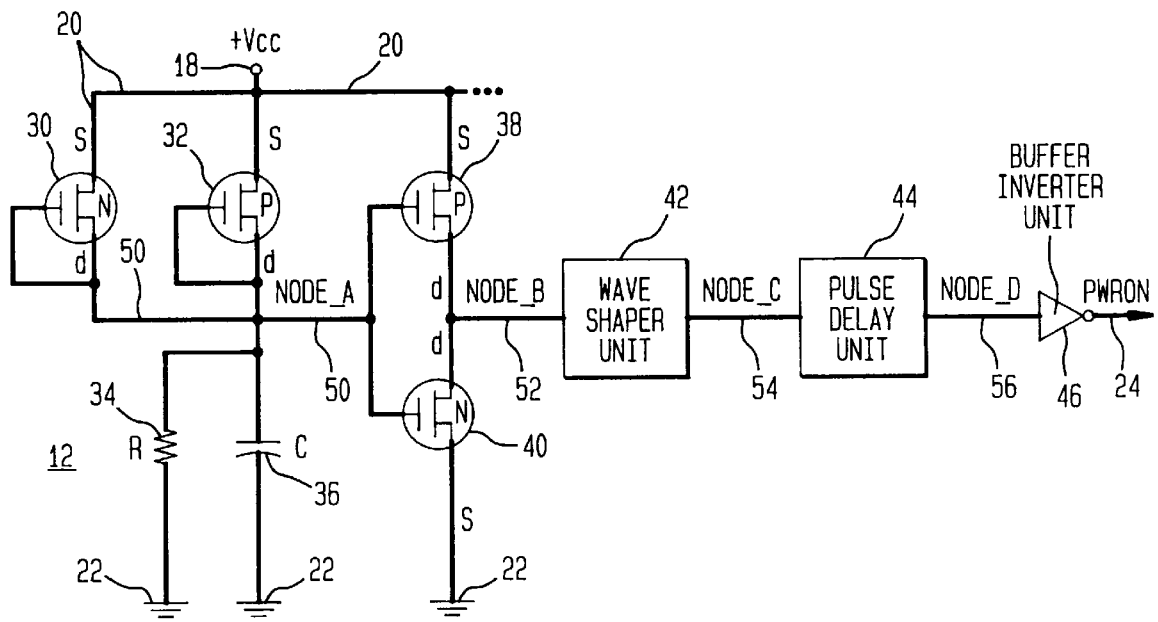
FIG. 2 is a schematic circuit diagram partly in block form showing further details of the power-on detection circuit provided in accordance with the invention.

Referring now to FIG. 2, there is shown an embodiment partly in schematic circuit form and partly in block form, of the power-on detection circuitry 12 of FIG. 1. Circuity 12 comprises p-channel field effect transistors (FETS) 32 and 38, n-channel field effect transistors (FETS) 30 and 40, a resistor 34, a capacitor 36 (typically a parasitic capacitor associated with resistor 34 and the transistors 30, 32, 38 and 40), a wave-shaper unit 42 (shown in block diagram), a pulse-delay unit 44 (shown in block diagram), and a buffer-inverter unit 46 (shown in block diagram). Transistors 30, 32 38, and 40 are typically of the metal-oxide-silicon (MOS) type and may denoted as MOSFETS. Each transistor has a gate, and first and second output terminals. The combination of transistors 32, 38, and 40 and resistor 34 may be denoted as voltage pulse generating means. Transistor 30 may be denoted as voltage lowering means. Resistor 34 may be denoted a resistive means and capacitor 36 may be denoted as capacitance means. In a p-channel transistor current flows from the source to the drain. Thus the source is the first output terminal and the drain is the second output terminal. In an n-channel transistor the current flows from the drain to the source and thus the first output terminal is the drain and the second output terminal is the source. The wave-shaper unit 42, pulse-delay unit 44 and buffer-inverter unit 46 are circuits well known in the art and are not described in detail. Also power connections to them from +VCC and ground are not shown though in fact present.

The sources of transistors 30, 32, and 38 are coupled to the terminal 18 which is coupled to a voltage source +VCC. The voltage power source (shown as +VCC) can be at 0 volts (when turned off) or up to a level of +VCC volts (when turned on). Thus the voltage applied to terminal 18 can be between 0 and +VCC volts. Noise spike can cause terminal 18 to be less than +VCC even if the power supply is turned on. The gates and drains of transistors 30 and 32, the gates of transistors 38 and 40, a first terminal of resistor 34 and a first terminal of capacitor 36 are all coupled to a terminal 50 (node A). Second terminals of resistor 34 and capacitor 36 and the source of transistor 40 are coupled to the terminal 22 and to a reference voltage supply which is shown as ground. The drains of transistors 38 and 40 are coupled to an input of wave shaper unit 42 and to a terminal 52 (node B). An output of waveshaper 42 is coupled to an input of pulse delay unit 44 and to a terminal 54 (node C). An output of pulse delay unit 44 is coupled to an input of buffer inverter unit 46 and to a terminal 56 (node D). An output of buffer inverter unit 46 is coupled to a line 24 and generates an output signal PWRON. The transistor 30, which is connected as a diode with the gate and drain thereof coupled together to terminal 50, conducts current only in the direction from the terminal 50 to the terminal 18 when the voltage on terminal 50 is more positive than that at the terminal 18. This will be explained in greater detail hereinafter. Transistor 32 is also connected as a diode with the gate and drain thereof coupled together to terminal 50. The number and sizes of the elements in the power-on detection circuitry 12 are relatively small and thus can be fabricated on an integrated circuit chip using CMOS technology without requiring much area on the chip. Voltage waveforms during initial power-on detection at the terminals 18, 50, 52, 54, and 56 and the lead 24 (PWRON) are described in detail hereinafter.

When power supply voltage is first turned on, the voltage at the terminal 18 is zero. As this voltage rises above a threshold voltage (Vth) of the p-channel transistor 32, which is diode-connected, the transistor 32 begins to conduct current to terminal 22 and ground through the resistor 34. Thereafter, as the supply voltage at the terminal 18 continues to rise, the voltage at the terminal 50 rises in proportion to the current through the resistor 34 and the increasing supply voltage.

As the supply voltage at the terminal 18 rises above the threshold voltages (Vth) of transistors 38 and 40, these transistors begin to turn on. The net result is that terminal 52 is first pulled up towards +VCC, and then as transistor 40 is turned on harder and transistor 38 is turned off, the voltage on terminal 52 drops to ground. The rise and then fall in the voltage at terminal 52 as power is being turned on produces a short-duration pulse and results in the generation of a suitably delayed PWRON signal on the lead 24. This will be described in greater detail hereinafter.

When the supply voltage at the terminal 18 reaches a stable operating level (e.g., about +3.3 volts), the voltage on terminal 50 is held at that level minus the threshold voltage Vth of the diode-connected transistor 32 (+VCC-Vth). Terminal 52 is held at zero level by turned-on transistor 40 which is held on by the positive voltage at the terminal 50. Transistor 38 is essentially biased off by the positive voltage on terminal 50. The threshold voltages of the transistors 32, 38 and 40 are typically the same (e.g., each about 0.6 volt). The threshold voltage Vth of transistor 30 is typically lower than that of transistors 32, 38, and 40 and is typically about 0.3 volt. These are important design features of the invention.

In order to keep the current drawn by transistor 32 small, once the supply voltage has reached full level (+VCC), the resistor 34 is selected to have a high resistance value (e.g., about 2 megohms). To achieve this high resistance, resistor 34 is typically fabricated as a diffusion device with a relatively large diffusion area, a technique well known in the art. However, as a consequence of this large diffusion area, the resistor 34 has associated with it a relatively large parasitic capacitance (e.g., about one picofarad), which is represented by the capacitor 36 which also includes the parasitic capacitance associated with the gates of transistors 38 and 40 as well as that associated with the gates and drains of transistors 30 and 32. The relatively large value of the capacitor 36 (parasitic capacitance) would otherwise, but for the present invention, make it impossible for the power-on detection circuitry 12 to respond quickly to a sudden, short duration negative voltage transient superimposed on the level of +VCC and then to generate a new PWRON signal. This will be explained in detail hereinafter. If the circuitry 12 were unable to respond quickly enough to sudden negative transients in the supply voltage, erroneous (random) settings of the latches in the latches and reset circuits 14 and improper operation of the main circuits 16 could result.

As was explained above, a voltage pulse is generated at terminal 52 when the supply voltage is turned on and rises above a certain level. The voltage pulse at terminal 52 is applied to the wave-shaper unit 42 which produces a shaped pulse with sharp rising and falling edges. This shaped pulse appearing at terminal 54 is applied to the pulse-delay unit 44 which produces at the terminal 56 a stretched voltage pulse with a falling edge considerably delayed (e.g., by about one microsecond). The stretched and delayed voltage pulse at the terminal 56 is applied to the buffer-inverter unit 46 which produces on the lead 24 a positive-going PWRON signal suitably delayed (e.g., by about one microsecond) to allow the supply voltage at the terminal 18 to fully stabilize at sufficient operating level. Only when a PWRON signal is applied via the lead 24 to the latches and reset circuits 14 (see FIG. 1) are the latches properly set (or reset) to their predetermined initial conditions. If the power supply voltage at the terminal 18 suddenly drops below a certain level (e.g., about +0.4 volt), the latches lose their settings and are randomly reset unless a new PWRON signal is generated when the supply voltage rises again and the latches properly reinitialized. The present invention insures that a new PWRON signal is generated even with power interruptions lasting only nanoseconds. Of course, power-off conditions lasting a long time also result in a new PWRON signal being generated, as described above.

Figure 3:
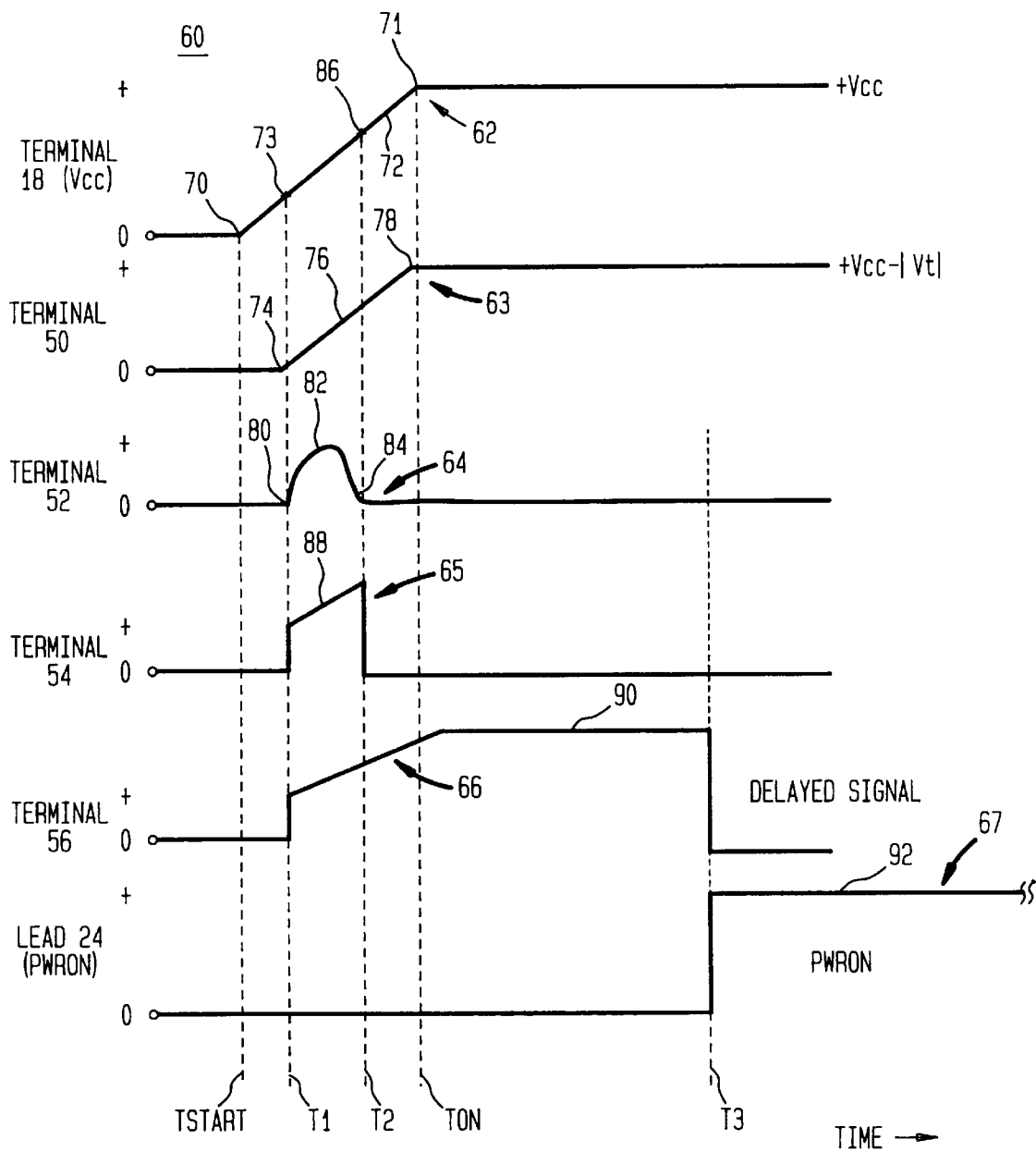
FIG. 3 is a graph schematically showing related waveforms generated at various nodes of the power-on detection circuit of FIG. 2.

Referring now to FIG. 3, there is shown a graph 60 schematically illustrating related voltage waveforms 62, 63, 64, 65, 66 and 67, which appear respectively at the terminals 18, 50, 52, 54, and 56, and at the lead 24 in the power-on detection circuitry 12 when power is turned on. The vertical axis of the graph 60 shows respective voltages "0" to "+" of the various waveforms, and the horizontal axis shows time. The waveforms are not necessarily to scale.

The waveform 62 shows the voltage rise at the terminal 18 when power is turned on at a starting time "Tstart". The voltage rises from zero (0) at a point 70 to full level (e.g., about +3.3.v) at a point 71 at a time "TON" along an upwardly sloping line 72. The elapsed time from "Tstart" to "T on" is less than a microsecond, for example. The power remains on at the full level (+VCC) indicated by the point 71 until intentionally turned off or until unintentionally interrupted. When a voltage level, indicated at a point 73 on the line 72 of the waveform 62 and a time T1, is reached, the threshold voltage (Vth) of the transistor 32 is exceeded and the transistor 32 turns on. The voltage at terminal 50, indicated by the waveform 63, then begins to rise from zero at a point 74 along a line 76, which has the same slope as the line 72 of the waveform 62, to a point 78 at the time "T on". The voltage of terminal 50 thereafter (so long as power stays on) remains at the level of the point 78. This level is +VCC minus the magnitude of the threshold voltage Vth (about 0.6v) of the transistor 32, as was explained previously.

As the voltage at terminal 50 begins to rise from zero at the time T1, transistors 38 and 40 are both turned on and the voltage at the terminal 52, indicated by the waveform 64, rises from zero at a point 80 and the time T1, forming a short duration pulse 82 which then quickly drops back to zero at a point 84 and a time T2. At the time T2 transistor 38 is biased off and transistor 40 is heavily biased on. The voltage level of terminal 18 indicated by a point 86 along the line 72 of the waveform 62 is the level at which transistor 38 is biased off and transistor 40 is heavily biased on.

The rounded pulse 82 at the terminal 52 is shaped by the wave-shaper unit 42 which, as seen in the waveform 65 produces a shaped pulse 88 at the terminal 54. The pulse 88 is in turn expanded in duration by the pulse-delay unit 44 which produces at the terminal 56 a pulse 90 of the waveform 66. The pulse 90 extends from the time T1 to a time T3, a period for example of about a microsecond. It will be noted that by the time T3 and the end of the pulse 90, the voltage at the terminal 18 (waveform 62) has stabilized at full operating level (+VCC).

When pulse 90 ends at the time T3, the buffer-inverter unit 46 applies to the lead 24, as indicated by the waveform 67, a signal 92 which is the PWRON signal as applied via the lead 24 to the latches and reset circuits 14 (FIG. 1). After the latches have been initialized, the next PWRON signal will only be generated when the supply voltage at the terminal 18 is turned off and then turned back on. The present invention provides almost instant detection of a power-off condition thus ensuring that even though power is interrupted for only a few nanoseconds there will be generated a new PWRON signal for re-setting the latches.

The transistors 32, 38 and 40, and the resistor 34 (FIG. 2) constitute a pulse-forming network in which they are connected as an inverter. When the supply voltage has risen sufficiently (to full level or nearly so), the voltage of terminal 50 is held up (slightly under supply voltage) and the voltage at terminal 52 held down at zero. But these transistors have non-linear threshold conduction characteristics adjacent their respective threshold voltages, as is well known in the art. Thus, when supply voltage (waveform 62) at the terminal 18 is first turned on (Time=Tstart) and is rising from zero to +VCC (TON), this network of transistors 32, 38 and 40 and resistor 34 generates in the time interval T1 to T2 the pulse 82 of the waveform 64 at the terminal 52. This pulse 82, which is typically only a small fraction of a microsecond in duration, in turn causes the generation of the PWRON signal 92 at a suitable, considerably later time (T3) after the supply voltage has stabilized at its operating level +VCC (about +3.3v).

The voltage waveform 63 of the terminal 50 in the illustration given here is at zero volts at the time Tstart. Later, after the time T1, the voltage at the terminal 50 rises in unison with the voltage at the terminal 18 (waveform 62) but is lower in amplitude by an amount equal to the magnitude of the threshold voltage Vth of the diode-connected p-channel transistor 32. Note again that the threshold voltages Vth of the transistors 32, 38 and 40 are all equal in magnitude (about 0.6 volt).

If, when power is turned on, the voltage at the terminal 50 were to start at a level appreciably above zero (e.g., at a voltage equal in magnitude to the threshold voltage Vth of the transistors 38 or 40), the pulse 82 at the terminal 52 (waveform 64) will not be properly formed (or formed at all) during the time from T1 to T2 as the supply voltage at the terminal 18 is rising along the line 72 of the waveform 62. As a consequence, no new PWRON signal 92 would be generated when power is turned on and supply voltage begins to rise. The present invention insures that terminal 50 is almost instantly returned to near zero (e.g., below about +0.4 volt) when power is turned off or suddenly interrupted. Thus a new pulse 82 at the terminal 52 and a new PWRON signal 92 on the lead 24 are sure to be generated whenever power is turned back on, either immediately after power-off or at a later time.

Figure 4:
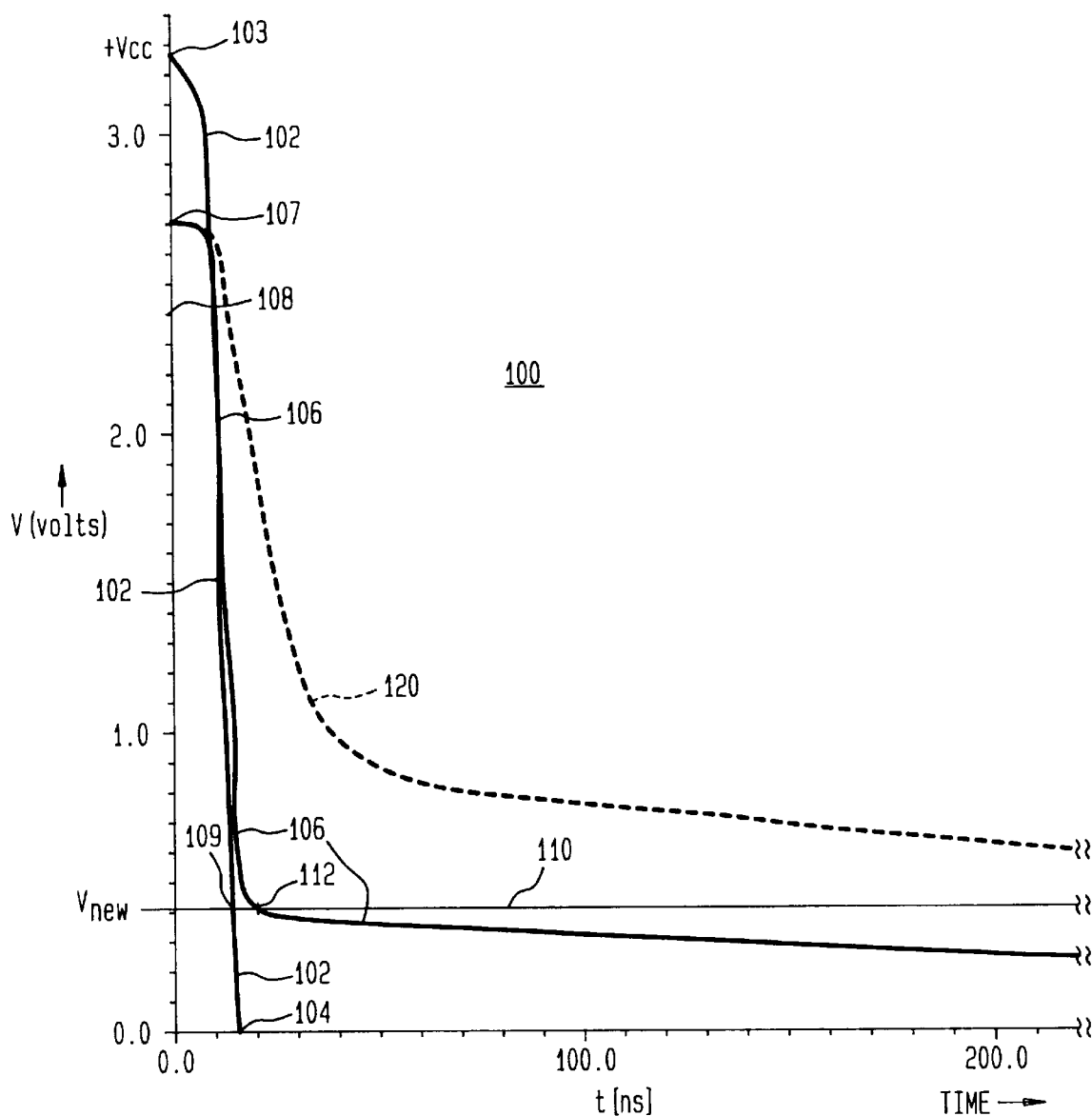
FIG. 4 is a graph schematically illustrating a power-off condition with a sudden negative voltage wave, and also showing a resulting voltage wave at a node within the power-on detection circuit illustrating the fast power-off detection provided by the invention, and further showing (in dashed line) a hypothetical voltage wave at the same node illustrating undesirably slow power-off detection by the power-on detection circuit in the absence of the invention.

Referring now to FIG. 4, there is shown a graph 100 schematically illustrating respective voltages versus time at the terminal 18 and at the terminal 50 when power to the power-on detection circuit 12 is turned off (e.g., by a sudden negative voltage transient). The vertical axis of the graph 100 indicates voltage in volts, and the horizontal axis indicates time in nanoseconds. The graph 100 shows a first negative-going voltage wave 102 (power-off) dropping in nanoseconds from a point 103, representing +VCC at the terminal 18, to zero at a point 104. This voltage wave 102 illustrates that when power to the terminal 18 is interrupted for even a few nanoseconds, the voltage there almost instantly drops to zero.

The graph 100 also shows a second negative-going voltage wave 106 representing the voltage on terminal 50. The initial voltage level at terminal 50 in the illustration here and as indicated by a point 107 on the vertical axis, is lower than +VCC by the magnitude of the threshold voltage Vth of the p-channel transistor 32 (FIG. 2) as was previously explained.

It is noted again that the n-channel transistor 30 (see FIG. 2) is diode-connected with its source connected via the buss 20 to the terminal 18 and its drain and gate connected in common with the terminal 50. Thus the transistor 30 does not conduct until the voltage at the terminal 18 drops below the voltage then on terminal 50 by more than the magnitude of the threshold voltage Vth of the transistor 30 (about 0.3 volts). The level at which the transistor 30 begins to conduct is indicated on the vertical axis of the graph 100 by a point 108. When the transistor 30 conducts it shunts the charge on the capacitor 36 (parasitic capacitance) to ground so that as the voltage on the terminal 18 continues its sudden drop (voltage wave 102), the voltage on the terminal 50 (voltage wave 106) immediately follows it.

As the voltage wave 102 drops toward zero, it passes at a point 109 through a voltage level indicated by a horizontal line 110 and designated "Vnew" (about +0.4 volt). This voltage level Vnew is beneath the threshold voltage Vth (about 0.6 volt) of the p-channel transistor 32, of the p-channel transistor 38 and of the n-channel transistor 40, and these transistors will be turned off. However, the diode-connected n-channel transistor 30 continues to conduct until its threshold voltage Vth (about 0.3 volt) is reached. Thus the voltage wave 106 of the terminal 50 drops rapidly below the horizontal line 110 (Vnew) at a point 112. Note that the point 112 is separated from the point 109 by only several nanoseconds. After the terminal 50 and voltage wave 106 drop to about +0.3 volt (equal in magnitude to the threshold voltage Vth of the transistor 30) the transistor 30 ceases to conduct. Thereafter the capacitor 36 discharges solely through the resistor 34 and the voltage wave 106 follows an exponential, generally horizontal curve declining to zero at a much later time (not shown on the graph 100).

The voltage level Vnew is above a voltage level at which the latches in the latches and reset circuits 14 lose their initialized settings and hence need to be reset. The latch settings remain intact so long as the voltage at the terminal 18 stays above Vnew. In any event, if the voltage at the terminal 18 (and the terminal 50) at any time falls below Vnew, a new PWRON signal will automatically be applied to the lead 24 and the latches will be re-set.

The graph 100 also shows as a dashed line a hypothetical voltage waveform 120. This hypothetical voltage wave 120 schematically illustrates the voltage decay (when power is suddenly interrupted as shown by the voltage wave 102) at the terminal 50 in the absence of the diode-connected n-channel transistor 30 (FIG. 2). As the hypothetical voltage wave 120 illustrates, the voltage at the terminal 50 decays exponentially at a relatively slow rate (compared to the voltage wave 106) since charge bleeds from the capacitor 36 mostly through the high ohmage resistor 34. There would be a lengthy time (e.g., roughly a microsecond or so—not shown here) for the voltage at the terminal 50 to fall below the level of Vnew (horizontal line 110). During such time the voltage at the terminal 18 might easily come back on (not shown in the graph 100), but no new PWRON signal would be generated in this hypothetical case. The latches then would not be reset. It is highly important to avoid such a condition as this, as was explained above.

Various modifications in the power-on detection circuit disclosed may occur to those skilled in the art and can be made without departing from the spirit and scope of the invention as set forth in the accompanying claims. For example, voltage levels and threshold voltages other than those disclosed may be employed, and the pulse delays and the on and off times may be changed to those best suited for a given application. Still further, the power-on detection circuitry is not limited in application to a particular size of IC or to specific other (main) circuits on the IC. Still further, the ohmage of the resistor 34 may be changed to a level as best needed. Still further, the conductivity types of the transistors may be reversed and a negative level and ground can be the power supply levels.

What is claimed is:

1. Power-on detection circuitry comprising:

first and second p-channel field effect transistors and first and second n-channel field effect transistors, each of the transistors having a gate, and first and second output terminals, the threshold voltages of the first and second p-channel transistors and of the first n-channel transistor all having a first value, and the threshold voltage of the second n-channel transistor having a second value which is substantially less than the first value;

resistive means, which has first and second terminals, for providing a resistance between the first and second terminals;

parasitic capacitive means for storing charge;

the gates of all of the transistors, the first output terminals of the second p-channel and n-channel transistors, the first terminal of the resistive means, and the capacitive means all being coupled to a first common terminal;

the first output terminal of the first p-channel transistor, the second output terminal of the second p-channel transistor and the second output terminal of the second n-channel transistor being coupled to a first power supply terminal;

the second output terminal of the first p-channel transistor and the first output terminal of the first n-channel transistor being coupled to an output terminal of the power-on detection circuitry; and the second terminal of the resistive means and the second output terminal of the first n-channel transistor being coupled to a second power supply terminal.

2. The power-on detection circuitry of claim 1 wherein the threshold voltages of the p-channel transistors and the first n-channel transistor are all about 0.6 volts and the threshold voltage of the second n-channel transistor is about 0.3 volts.

3. The power-on detection circuitry of claim 1 wherein the resistive means is a resistor of about two megohms.

4. The power-on detection circuitry of claim 1 further comprising pulse shaping and delay means, which has an input coupled to the second common terminal and which has an output, for generating a voltage pulse signal suitable to be coupled to latches which are to be set upon power being turned on.

5. Power-on detection circuitry for generating a power-on signal to activate the setting of memory cell latches to initial preset conditions after a power supply coupled to the circuitry and latches has been turned on or turned back on after a sudden interruption, the circuit and latches being implemented in complementary metal oxide semiconductor technology on an integrated circuit chip also containing main circuits which receive necessary information from the latches during operation when power is on, the circuitry comprising:

first and second p-channel field effect transistors and first and second n-channel field effect transistors, each of the transistors having a gate, and first and second output terminals;

a resistor having first and second terminals;

the gates of all of the transistors, the first output terminals of the second p-channel and n-channel transistors, and the first terminal of the resistor all being coupled to a common terminal which has a parasitic capacitance associated therewith;

the first output terminal of the first p-channel transistor, the second output terminal of the second p-channel transistor and the second output terminal of the second n-channel transistor being coupled to a first power supply terminal;

the second terminal of the resistor and the second output terminal of the first n-channel transistor being coupled to a second power supply terminal;

the latches being coupled between the first and second power supply terminals and needing to be set or re-set to initial conditions when the voltage at the first and second power supply terminals falls below a first value;

the combination of the first and second p-channel transistors, the first n-channel transistor, and the resistor generating a voltage pulse at the first outputs of the first p-channel transistor and the first n-channel transistor when the power supply, which is coupled between the first and second power supply terminals, is turned-on or turned back on after a sudden interruption and the voltage at the common terminal is at or below the first value;

the first and second p-channel transistors and the first n-channel transistor, each having a respective threshold voltage greater in magnitude than the first value;

the second n-channel transistor having a threshold voltage lower in magnitude than the first value and providing a low resistance shunt path for lowering within a few nanoseconds the voltage of the common terminal to a second value, lower than the first value when power is suddenly interrupted such that the power-on detection circuitry detects the power interruption and the combination of the first and second p-channel transistors, the first n-channel transistor, and the resistor generates another voltage pulse at the first outputs of the first p-channel transistor and the first n-channel transistor when power is again turned-on; and pulse shaping and delay means coupled between the first output terminals of the first p-channel transistor and the first n-channel transistor and the latches for generating from each voltage pulse appearing at these output terminals a power-on signal to activate setting of the latches.

6. The power-on detection circuitry of claim 5 wherein the threshold voltages of the p-channel transistors and the first n-channel transistor are all about 0.6 volts and the threshold voltage of the second n-channel transistor is about 0.3 volts.

7. The power-on detection circuitry of claim 5 wherein the resistive means is a resistor of about two megohms and has parasitic capacitance associated therewith.

8. Power-on and fast power-off detection circuitry for generating a power-on signal to activate the setting of latches to initial preset conditions after a power supply coupled to the circuitry and latches has been turned on or turned back on after a momentary interruption, the circuit and latches being implemented in complimentary metal oxide semiconductor technology on an integrated circuit chip, the latches supplying necessary information to main circuits during operation when power is on, the circuitry comprising:

first and second power supply terminals for supplying operating voltage to the circuitry, latches and main circuits;

a plurality of transistors connected in a pulse forming network which produces at an output thereof a short duration pulse as the voltage at the power supply terminals rises from zero to full operating value, the threshold voltages of the plurality of transistors being respectively equal to each other, the network having an internal node which must be at or near zero volts when power is turned on in order for a short duration pulse to be generated by the network, the internal node having parasitic capacitance associated with it;

pulse shaping means coupled to the output of the network for forming a delayed power-on signal in response to each short pulse;

a plurality of latches connected between the power supply terminals, the latches being coupled to receive a power-on signal and in response thereto being set to initial values, the latches losing their settings and having to be reset when the voltage at the supply terminals falls below a minimum operating voltage; and a diode connected transistor coupled between one of the power supply terminals and the internal node of the pulse forming networks, the diode-connected transistor having a threshold voltage which is less in magnitude than the minimum operating voltage of the latches, the magnitude of the threshold voltages of the plurality of transistors in the pulse forming network being greater than the minimum operating voltage of the latches and substantially greater than that of the diode-connected transistor, the diode-connected transistor discharging the voltage at the internal node of the pulse forming network to a value near zero and below the minimum operating voltage of the latches whenever power supply voltage is interrupted to insure that a new power-on signal is generated to reset the latches even though power voltage is interrupted for only a few nanoseconds.

9. The power-on detection circuitry of claim 8 wherein the threshold voltages of the plurality of transistors are each about 0.6 volt, the minimum operating voltage of the latches is about 0.4 volt and the threshold voltage of the diode-connected transistor is about 0.3 volt.

10. The power-on detection circuitry of claim 8 wherein the pulse forming network includes a high ohmage resistor coupled between the internal node and one of the power supply terminals, the resistor because of its high resistance having substantial parasitic capacitance associated with it.

* * * * *